(12) United States Patent
Cai

(10) Patent No.: US 10,037,587 B2
(45) Date of Patent: Jul. 31, 2018

(54) COLOR IMAGE WATERMARKING

(71) Applicant: Macau University of Science and Technology, Macau (CN)

(72) Inventor: Zhanchuan Cai, Macau (CN)

(73) Assignee: Macau University of Science and Technology, Macau (CN)

( * ) Notice: Subject to any disclaimer, the term of this patent is extended or adjusted under 35 U.S.C. 154(b) by 73 days.

(21) Appl. No.: 15/360,936

(22) Filed: Nov. 23, 2016

(65) Prior Publication Data

US 2018/0144433 A1  May 24, 2018

(51) Int. Cl.
*G06K 9/00* (2006.01)
*G06T 1/00* (2006.01)
*G06T 7/40* (2017.01)

(52) U.S. Cl.
CPC ........... *G06T 1/0021* (2013.01); *G06T 7/408* (2013.01); *G06T 2201/005* (2013.01); *G06T 2201/0064* (2013.01); *G06T 2207/20021* (2013.01)

(58) Field of Classification Search
CPC . G06T 1/0021; G06T 7/408; G06T 2201/005; G06T 2201/0064; G06T 2207/20021
See application file for complete search history.

(56) References Cited

U.S. PATENT DOCUMENTS

| | | | |
|---|---|---|---|
| 6,614,914 B1* | 9/2003 | Rhoads | G06F 17/30876 382/100 |
| 8,265,334 B2* | 9/2012 | Yoo | G06T 1/0028 382/100 |
| 8,509,474 B1* | 8/2013 | Reed | G06T 1/0021 382/100 |
| 9,218,638 B2* | 12/2015 | Mehta | G06T 1/0028 |
| 2008/0247002 A1* | 10/2008 | Au | G06T 1/0028 358/3.28 |
| 2014/0022603 A1* | 1/2014 | Eschbach | H04N 1/32261 358/3.28 |

OTHER PUBLICATIONS

P.-Y. Lin, J.-S. Lee, and C.-C. Chang, Protecting the Content Integrity of Digital Imagery with Fidelity Preservation, ACM Transactions on Multimedia Computing Communications and Applications 7 (3) (2011) 726-742.
H. Shi, F. LV, and Y. Cao, A Dual Color Image Watermarking Scheme Based on Non-overlapping Blocks with Circulation, Journal of Computers 9 (8) (2014) 1871-1879.

(Continued)

*Primary Examiner* — Shefali Goradia
(74) *Attorney, Agent, or Firm* — Eagle IP Limited; Jacqueline C. Lui

(57) ABSTRACT

One example embodiment is a method to embed a watermark image into a host image such that a watermarked image is generated. The method divides a host image into an Red (R) component, a Green (G) component, and a Blue (B) component, and partitions each component of the R, G, and B components into non-overlapping blocks from which embedding blocks are selected to embed watermark information such that a watermarked image is generated.

17 Claims, 24 Drawing Sheets
(16 of 24 Drawing Sheet(s) Filed in Color)

(56) References Cited

OTHER PUBLICATIONS

J.-M.Shieh, D.-C.Lou, and M.-C.Chang, A Semi-blind Digital Watermarking Scheme Based on Singular Value Decomposition, Comput. Stand. Interfaces 28 (4) (2006) 428-440.

I. Cox, J. J Kilian, F. Leighton, and T. Shamoon, Secure Spread Spectrum Watermarking for Multimedia, IEEE Transaction on Image Processing 6 (12) (1997) 1673-1687.

C.-Q. Yin, L. Li, A. Qiang LV, and L. Qu, Color Image Watermarking Algorithm Based on DWT-SVD, Proceedings of the IEEE International Conference on Automation and Logistics, (2007) 2607-2611.

N.-H. Gole'A, R. Seghir, and R. Benzid, A Bind RGB Color Image Watermarking Based on Singular Value Decomposition, Proceedings of the ACS/IEEE International Conference on Computer Systems and Applications (AICCSA) 2010, pp. 1-5.

S.-C. Pei, H.-H. Liu, T.-J. Liu, and K.-H. Liu, Color image watermarking using SVD, 2012 IEEE International Conference on Multimedia and Expo, 2010, pp. 122-126.

Y. Xing, and J. Tan, A Color Watermarking Scheme Based on Block-SVD and Arnold Transformation, Second Workshop on Digital Media and its Application in Museum & Heritages, 2007, pp. 3-8.

S. Rastegar, F. Namazi, K. Yaghmaie, and A. Aliabadian, Hybrid Watermarking Algorithm Based on Singular Value Decomposition and Radon Transform, AEU—International Journal of Electronics and Communications 65 (7) (2011) 658-663.

R. Liu, and T. Tan, An SVD-Based Watermarking Scheme for Protecting Rightful Ownership, IEEE Transactions on Multimedia 4 (1) (2002) 121-128.

X. Zhang, and K. Li, Comments on "An SVD-Based Watermarking Scheme for Protecting Rightful Ownership", IEEE Transactions on Multimedia 7 (3) (2005) 593-594.

D. Kundur, and D. Hatzinakos, Toward Robust Logo Watermarking Using Multiresolution Image Fusion Principles, IEEE Transactions on Multimedia 6 (1) (2004) 185-198.

X. Zhu, J. Ding, H. Dong, K. Hu, and X. Zhang, Normalized Correlation-Based Quantization Modulation for Robust Watermarking, IEEE Transactions on Multimedia 16 (7) (2014) 1888-1904.

S. Wang, D. Zheng, J. Zhao, W. Tam, and F. Speranza, Adaptive Watermarking and Tree Structure Based Image Quality Estimation, IEEE Transactions on Multimedia 16 (2) (2014) 311-325.

A. Subramanyam, S. Emmanuel, and M. Kankanhalli, Robust Watermarking of Compressed and Encrypted JPEG2000 Images, IEEE Transactions on Multimedia 14 (3) (2012) 311-325.

Q. Su, Y. Niu, X. Liu, and Y.Zhu, Embedding Color Watermarks in Color Images Based on Schur Decomposition, Optics Communications 285 (7) (2012) 1792-1802.

Q. Su, Y. Niu, G. Wang, S. Jia, and J. Yue, Color Image Blind Watermarking Scheme Based on QR Decomposition, Signal Processing 94 (1) (2014) 219-235.

K. Wang, G. Lavoue, F. Denis, and A. Baskurt, A Comprehensive Survey on Three-Dimensional Mesh Watermarking, IEEE Transactions on Multimedia 10 (8) (2008) 1513-1527.

N. Bi, Q. Sun, D. Huang, Z. Yang, and J. Huang, Robust Image Watermarking Based on Multiband Wavelets and Empirical Mode Decomposition, IEEE Transactions on Image Processing 16 (8) (2007) 1956-1966.

M. Ali, and C. W, Ahn, An Optimized Watermarking Technique Based on Self-adaptive DE in DWT-SVD Transform Domain, Signal Processing 94 (1) (2014) 545-556.

M. Barni, F. Bartolini, V. Cappellini, and A. Piva, A DCT-domain System for Robust Image Watermarking, Signal Processing 66 (3) (1998) 357-372.

L. Chen, D. Zhao, and F. Ge, Gray Images Embedded in a Color Image and Encrypted with FRFT and Region Shift Encoding Methods, Optics Communications 283 (10) (2010) 2043-2049.

S. Rawat, and B. Raman, A new robust watermarking scheme for color images, Advance Computing Conference (IACC), 2010 IEEE 2nd International, 2010, pp. 206-209.

A. Tre'Meau, and D. Muselet, Recent Trends in Color Image Watermarking, Journal of Imaging Science and Technology 53 (1) (2009) 10201-1-10201-15(15).

W. Jiang Wang, W. Zuo, and X. Mei Yan, New Gray-scale Watermarking Algorithm of Color Images Based on Quaternion Fourier Transform, Third International Workshop on Advanced Computational Intelligence (IWACI), (2010) 593-596.

Kintak U, S. Hu, D. Qi, and Z. Tang, A Robust Image Watermarking Algorithm Based on Non-Uniform Rectangular Partition and DWT, 2009 2nd International Conference on Power Electronics and Intelligent Transportation System, vol. 2, 2009, pp. 25-28.

Kintak U, S. Hu, D. Qi, and Z. Tang, A Robust Image Watermarking Algorithm Based on Non-Uniform Rectangular Partition and DCT-SVD, 2013 Fifth International Conference on Measuring Technology and Mechatronics Automation, 2010, pp. 327-330.

U. Tak, Z. Tang, and D. Qi, A non-uniform rectangular partition coding of digital image and its application, Proceedings of the 2009 IEEE International Conference on Information and Automation, 2009, pp. 995-999.

Y. Naderahmadian, and S. Hosseini-Khayat, Fast Watermarking Based on QR Decomposition in Wavelet Domain, International Conference on Intelligent Information Hiding and Multimedia Signal Processing, (2010) 127-130.

\* cited by examiner

100

Algorithm 1 The non-uniform rectangular partition algorithm

```
1:  function PARTITION(G, H)
2:      error ← 7
3:      n ← 1
4:      for j = G(y) to G(y) + G(w) − 1 do
5:          for i = G(x) to G(x) + G(h) − 1 do
6:              Z(n) ← H(i, j)
7:              X(n) ← i
8:              Y(n) ← j
9:              n ← n + 1
10:         end for
11:     end for
12:     result ← lsqcurvefit('curvefun', [1, 1, 1], [X; Y], z)
13:     e ← norm(curvefun(result, [X; Y]) − z)²;
14:     if e < error then
15:         store(G(x),G(y),G(w),G(h));
16:         return
17:     else
18:         if ( thenG(w) === 1||G(h) === 1)
19:             return
20:         else
21:             newW1 ← G(w)/2
22:             newW2 ← G(w) − newW1
23:             newH1 ← G(h)/2
24:             newH2 ← G(h) − newH1
25:             partition(H,G(G(x),G(y),newW1,newH1))
26:             partition(H,G(G(x),G(y)+newW1,newW2,newH1))
27:             partition(H,G(G(x)+newH1,G(y),newW1,newH2))
28:             partition(H,G(G(x)+newH1,G(y)+newW1,newW2,
29: newH2))
30:         end if
31:     end if
32: end function
```

| Index | Attacks |
|---|---|
| 1 | Salt-and pepper noise addition(0.02) |
| 2 | Salt-and pepper noise addition(0.1) |
| 3 | Gaussian noise addition(5%) |
| 4 | Gaussian noise addition(8%) |
| 5 | JPG compression(30) |
| 6 | JPG compression(90) |
| 7 | JPG 2000 compression(20) |
| 8 | JPG 2000 compression(50) |
| 9 | Scaling(4) |
| 10 | Cropping(25%) |
| 11 | Cropping(50%) |

1000

| Method | Yashar [30] | Su schat [16] | Su qr [17] | Proposed |
|---|---|---|---|---|
| Watermarked image(PSNR(db)) | 59.8167 | 35.4335 | 38.8654 | 51.2957 |
| Extracted watermark(NC) | 1.000 | 0.9268 | 1.000 | 1.000 |
| Watermarked image(PSNR(db)) | 59.6546 | 39.8812 | 38.0064 | 46.5089 |
| Extracted watermark(NC) | 1.000 | 0.8529 | 1.000 | 1.000 |

1110

1120

1130

1140

1150

1160

1170

1180

1190

1192

1194

1210

| Lena | | | | |
|---|---|---|---|---|
| Attack index | Proposed | Su qr [17] | Yashar [30] | Su schur [16] |
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |

1220

| Avion | | | | |
|---|---|---|---|---|
| Attack index | Proposed | Su qr [17] | Yashar [30] | Su schur [16] |
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |

| Attack index | House | | | |
|---|---|---|---|---|
| | Proposed | Su qr [17] | Yashar [30] | Su schur [16] |
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |

| Ivytree | | | | |
|---|---|---|---|---|
| Attack index | Proposed | Su qr [17] | Yashar [30] | Su schur [16] |
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |

| Arnold key KA | Right | Wrong | Right | Wrong |
|---|---|---|---|---|
| R List | Right | Right | Wrong | Wrong |
| Proposed Extracted watermark | | | | |

| Method | Watermark length (Bit) | Host image(Pixel) | Bit/Pixel |
|---|---|---|---|
| Yashar [30] | 88 × 88 | 512 × 512 | 0.02954 |
| Su schur [16] | 32 × 32 × 24 | 512 × 512 × 3 | 0.03125 |
| Su qr [17] | 32 × 32 × 24 | 512 × 512 × 3 | 0.03125 |
| Proposed | 32 × 32 × 24 | 512 × 512 × 3 | 0.03125 |

Figure 17

COLOR IMAGE WATERMARKING

FIELD OF THE INVENTION

The present invention relates to image processing, and more particularly to methods and apparatus that provide color image watermarking.

BACKGROUND

With rapid development of Internet, humans can easily access or distribute multimedia data from networks. Copyright security and protection of the data are becoming important issues. Digital watermarking has been proposed as a technology to ensure multimedia copyright protection. The technology uses a kind of marker to embed imperceptible and detectable signals or information into digital multimedia content, such as images, audios, and videos.

New methods and apparatus that assist in advancing technological needs and industrial applications in watermarking and digital watermarks are desirable.

SUMMARY OF THE INVENTION

One example embodiment is a method to embed a watermark image into a host image such that a watermarked image is generated. An example method divides a host image into an Red (R) component, a Green (G) component, and a Blue (B) component, and partitions each component of the R, G, and B components into non-overlapping blocks from which embedding blocks are selected to embed watermark information such that a watermarked image is generated.

Other example embodiments are discussed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 shows a table illustrating adaptive partition in accordance with an example embodiment.

FIG. 12B shows a table illustrating extracted watermark images that are extracted with one or more methods in accordance with an example embodiment and another three prior art methods.

FIG. 13A shows a table illustrating extracted watermark images that are extracted with one or more methods in accordance with an example embodiment and another three prior art methods.

FIG. 14A shows a table illustrating extracted watermark images that are extracted with one or more methods in accordance with an example embodiment and another three prior art methods.

FIG. 14B shows a table illustrating extracted watermark images that are extracted with one or more methods in accordance with an example embodiment and another three prior art methods.

FIG. 16 shows a table illustrating experimental results of replacement key and selection sequence in accordance with an example embodiment.

FIG. 17 shows a table illustrating comparison of capacity between one or more methods in accordance with an example embodiment and another three prior art methods.

DETAILED DESCRIPTION

Figure 2A:
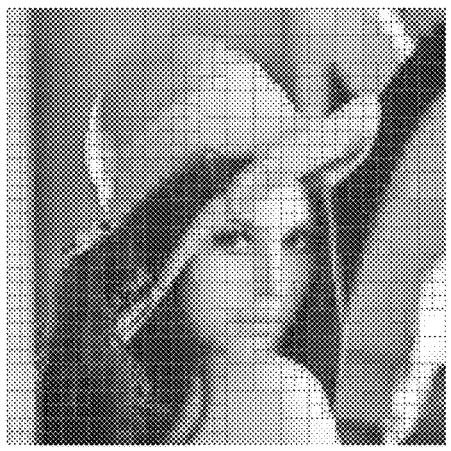
FIG. 2A shows a graph after adaptive partition with ε=16 in accordance with an example embodiment.

Example embodiments relate to methods and apparatus that enable color watermark image embedding and extracting.

Many existing color image watermarking methods or algorithms embed watermark information or data with the same intensity value into a host image. This type of method distorts the obtained watermarked image to a large extent. For example, due to different spatial frequencies, if watermark information is embedded into high frequency locations of a host image with high intensity, then imperceptibility will be reduced significantly.

Example embodiments solve such problems and provide a technical solution in new methods and apparatus that enable dual color image watermarking including digital watermark image embedding and extracting. Example embodiments provide digital watermarks that are used to verify the authenticity or integrity of a signal or an image and to verify the authenticity or identity of an owner of an image. Example methods incorporate adaptive partition and QR decomposition to achieve strong imperceptible capability or imperceptibility, and strong robustness performance against attacks such as image compression.

In an example embodiment, a host image is divided into a Red (R) component, a Green (G) component, and a Blue (B) component. Each component is adaptively partitioned into a plurality of non-overlapping blocks or sub regions or sub areas. The partition results are used to calculate intensity values for each non-overlapping block of the host image, and watermark information or data is embedded into the non-overlapping blocks after QR decomposition.

In an example embodiment, adaptive partition or non-uniform partition or non-uniform subdivision treatment is obtained through calculating low frequency and polynomial approximation of a host image. Based on the obtained results of the adaptive partition, a plurality of non-uniform blocks in the host image are determined and a plurality of embedding blocks that watermark information is to be embedded are selected from the plurality of non-uniform blocks. For each of the embedding blocks, QR decomposition is conducted to derive a matrix R that is an upper triangular matrix. Watermark information is embedded in the first row and the last or largest column of the matrix R for each embedding block. An inverse QR operation is performed to obtain a watermarked block that corresponds to this embedding block.

For each component of R, G, and B components of a host image, when all embedding blocks for this component are converted into watermarked blocks, a watermarked component image is formed that includes these watermarked blocks. Three watermarked component images that correspond to the R, G, and B components of the host image are reconstructed such that a watermark image is embedded into the host image to obtain a watermarked image.

Example embodiments include methods that extract a watermark image from a watermarked image to obtain the watermark image. Example methods can extract a watermark image without knowing the original host image and the original watermark image.

Example embodiments includes apparatus or computer systems that execute methods in accordance with one or more example embodiments.

FIG. 1 shows a Table 100 illustrating adaptive partition in accordance with an example embodiment. Unlike uniform rectangular partition, example adaptive partition, or adaptive subdivision or adaptive rectangular non-uniform partition or non-uniform subdivision treatment, takes characteristics of original images into account.

In an example embodiment, the partition process or non-uniform subdivision treatment starts from an initial partition area and carries on from bigger to smaller areas. For example, G represents an initial right rectangular area and the area G has position information (x, y), width value (w) and height value (h). Following an adaptive partition algorithm or a non-uniform rectangular partition algorithm as shown in Table 100 of FIG. 1 for example, G is divided or partitioned into a plurality of sub regions or sub areas or non-overlapping blocks until one or more conditions are satisfied. One example condition is the width or height of a sub region being equal to a minimum value such as 1.

In an example embodiment, $G_m$ represents m-th sub region or sub area, wherein m is sub region notation and is a positive integer. $G_m$ includes pixel set of $Q_i$ for sub region pixels, whose grey values are $h_i$.

By way of example, a s-th order bivariate piecewise polynomial or bivariate polynomial over $G_m$ (representing the image) is as follows:

$$f_m(P), P=(x,y) \in G_m \quad (1)$$

In an example embodiment, least squares fitting is applied for data or pixel values over $G_m$. For example, a condition is defined as $$e = \frac{1}{N}\sum_{i}^{N}[f_m(Q_i) - h_i]^2 < \varepsilon,$$

wherein N is the number of pixels within $G_m$ and $\varepsilon$ is a selective error control value. When conducting an initial partition, the bivariate polynomial and the selective error control value are determined. The satisfaction of $e<\varepsilon$ indicates that there is no need to carry on further partition and the partition process is completed. Otherwise, the partition process is conducted recursively or iteratively and the numbering is increased by one as shown in FIG. 1. The partition process lasts until $e<\varepsilon$ or the pixel number is equal to the number of undetermined coefficients of the bivariate polynomial. This is the process of an example adaptive partition or non-uniform subdivision treatment.

By way of example, the coefficients or parameters of $f_m(P)$ can be obtained from adaptive codes of a digital image. Data or results such as position information (x,y), width value (w) and height value (h) for sub regions during a partition process are stored as X, Y, W, H respectively, which are further stored into an array RNO.

As shown in FIG. 1, variable G denotes an initial area of starting partition, and variable H denotes list of areas from the original image, wherein each area includes position information (x,y), width value (w) and height value (h).

As further shown in FIG. 1, lines 12 and 13 of Table 100 calculate $$\frac{1}{N}\sum_{i}^{N}[f_m(Q_i) - h_i]^2 < \varepsilon$$

by applying the least squares fitting over G. store( ) function stores the result to AreaList.

Various forms can be used to define the bivariate piecewise polynomial $f_m(P)$. By way of example, $f(x, y)=ax+by+cxy+d$. In another example embodiment, $f(x, y)=ax^e+by^2+cxy+dx+ey+f$. Other forms, such as bi-quadratic, cubic, and bi-cubic equations forms, can be used as well.

Figure 2B:
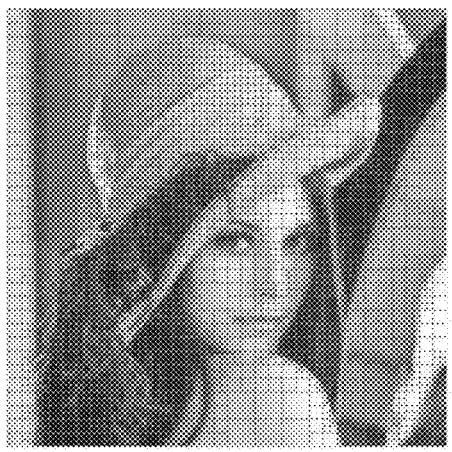
FIG. 2B shows a graph after adaptive partition with ε=10 in accordance with an example embodiment.
Figure 2C:
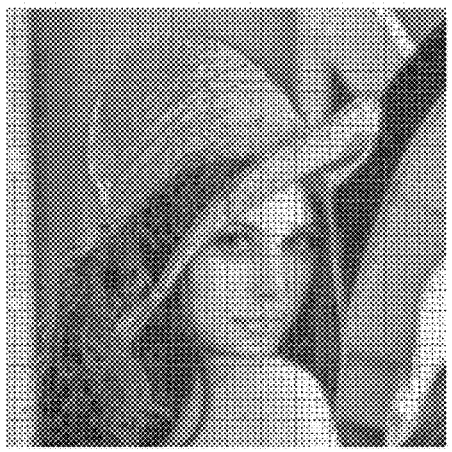
FIG. 2C shows a graph after adaptive partition with ε=7 in accordance with an example embodiment.

FIG. 2A shows a graph 210 after adaptive partition with $\varepsilon=16$ in accordance with an example embodiment. FIG. 2B shows a graph 220 after adaptive partition with $\varepsilon=10$ in accordance with an example embodiment. FIG. 2C shows a graph 230 after adaptive partition with $\varepsilon=7$ in accordance with an example embodiment.

FIGS. 2A-2C use a Lena image with size of 512×512 as illustrative examples. As shown, when the selective error control value becomes smaller, the number of sub areas or sub regions becomes larger.

Figure 3A:
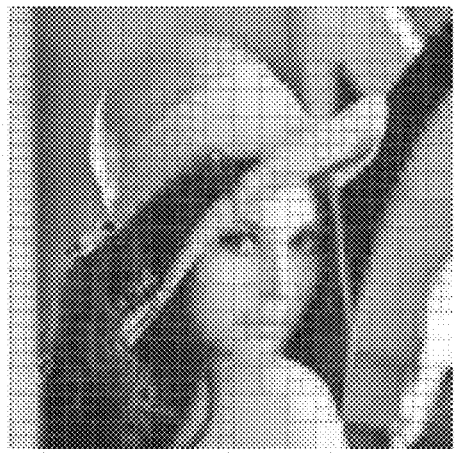
FIG. 3A shows an R component of a host image after partition in accordance with an example embodiment.
Figure 3B:
FIG. 3B shows a G component of a host image after partition in accordance with an example embodiment.
Figure 3C:
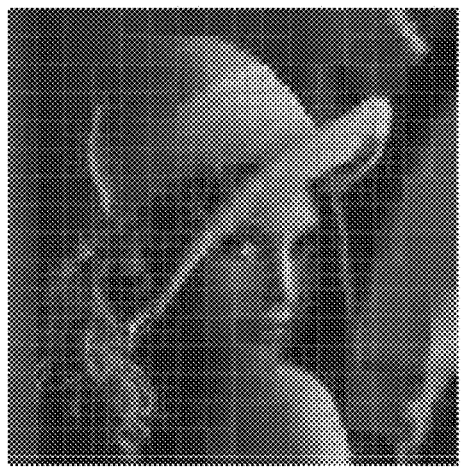
FIG. 3C shows a B component of a host image after partition in accordance with an example embodiment.

FIG. 3A shows an R component 310 of a host image after partition in accordance with an example embodiment. FIG. 3B shows a G component 320 of a host image after partition in accordance with an example embodiment. FIG. 3C shows a B component 330 of a host image after partition in accordance with an example embodiment.

FIGS. 3A-3C use a Lena image as illustrative examples. As shown, The Lena image is a color image that is divided into the R component 310, the G component 320, and the B component 330. Each component is shown respectively in FIGS. 3A-3C.

Figure 4:
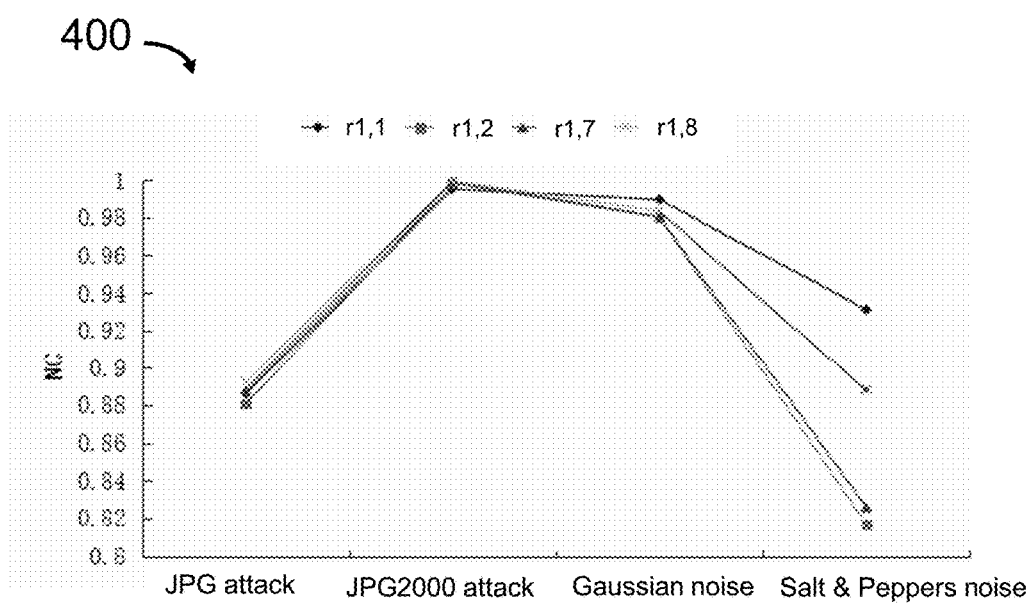
FIG. 4 shows a graph illustrating comparison of watermarking performance for different embedding positions in the first row of a matrix R in accordance with an example embodiment.

FIG. 4 shows a graph 400 illustrating comparison of watermarking performance for different embedding positions in the first row of a matrix R in accordance with an example embodiment.

A sub area or sub region or non-overlapping block can be decomposed or treated with QR decomposition or QR operation to obtain a matrix R and a matrix Q, wherein the matrix R is an upper triangular matrix and the matrix Q is an orthogonal matrix.

For example, for a QR decomposition, the orthogonal triangular decomposition of a matrix A is performed which is defined as:

$$[Q,R]=qr(A) \qquad (2)$$

Such that $A=Q \times R$, where Q denotes an orthogonal matrix such that $Q^T Q = I$, wherein $Q^T$ is a transposed matrix of Q, and I is a unitary matrix. R is an upper triangular matrix and is also called right triangular matrix.

Various methods can be used to conduct a QR decomposition, such as Gram-Schmidt process, Householder transformations and Givens rotations. By way of example, considering the Gram-Schmidt process applied to columns of a full column rank matrix $A=[a_1, \ldots, a_n]$ with Euclidean inner product, wherein $a_i$ (i=1, ..., n) is a column vector, the following formula is obtained:

$$u_1 = a_1, \ldots, u_k = a_k - \sum_{j=1}^{k-1} proj_{u_j} a_k, k = 2, \ldots, n$$

wherein $$proj_{u_j} a_k = \frac{\langle u_j, a_k \rangle}{\langle u_j, u_j \rangle},$$

and $\langle u_j, a_k \rangle$ is Euclidean inner product or inner product of $u_j$ and $a_k$. By way of example, $$q_1 = \frac{u_1}{\|u_1\|}, \ldots, q_k = \frac{u_k}{\|u_k\|}$$

wherein $\|u_i\|$ (i=1, ..., k) is modulus or norm of $u_i$ that represents magnitude or length of $u_i$. Then $a_1, \ldots, a_n$ are expressed in terms of the vectors $q_1, \ldots, q_n$ as $$a_1 = \langle q_1, a_1 \rangle, \ldots, a_k = \sum_{j=1}^{k} \langle q_j, a_k \rangle q_j$$

This can be expressed in matrix form as:

$$\begin{bmatrix} a_1 \\ a_2 \\ \vdots \\ a_n \end{bmatrix}^T = \begin{bmatrix} q_1 \\ q_2 \\ \vdots \\ q_n \end{bmatrix}^T \begin{bmatrix} \langle a_1, q_1 \rangle & \langle a_2, q_1 \rangle & \ldots & \langle a_n, q_1 \rangle \\ 0 & \langle a_2, q_2 \rangle & \ldots & \langle a_n, q_2 \rangle \\ \vdots & \vdots & & \vdots \\ 0 & 0 & \ldots & \langle a_n, q_n \rangle \end{bmatrix}$$

This equation is a factorization of A into the product of a matrix Q with orthonormal column vectors and an invertible upper triangular matrix R, and is called QR decomposition or QR operation of A.

In an example embodiment, an original pixel block A is an 8×8 matrix, and the QR decomposition of the matrix A is illustrated by Equation (2). QR multiplication or Q×R is shown in Equations (3) and (4) as stated below.

$$A = [a_1 \ a_2 \ \ldots \ a_7 \ a_8] = \begin{bmatrix} a_{1,1} & a_{1,2} & a_{1,3} & a_{1,4} & a_{1,5} & a_{1,6} & a_{1,7} & a_{1,8} \\ a_{2,1} & a_{2,2} & a_{2,3} & a_{2,4} & a_{2,5} & a_{2,6} & a_{2,7} & a_{2,8} \\ a_{3,1} & a_{3,2} & a_{3,3} & a_{3,4} & a_{3,5} & a_{3,6} & a_{3,7} & a_{3,8} \\ & & & \ldots & \ldots & & & \\ a_{8,1} & a_{8,2} & a_{8,3} & a_{8,4} & a_{8,5} & a_{8,6} & a_{8,7} & a_{8,8} \end{bmatrix} = \qquad (3)$$

$$QR = [q_1 \ q_2 \ \ldots \ q_7 \ q_8][r_1 \ r_2 \ \ldots \ r_7 \ r_8] =$$

$$\begin{bmatrix} q_{1,1} & q_{1,2} & q_{1,3} & q_{1,4} & q_{1,5} & q_{1,6} & q_{1,7} & q_{1,8} \\ q_{2,1} & q_{2,2} & q_{2,3} & q_{2,4} & q_{2,5} & q_{2,6} & q_{2,7} & q_{2,8} \\ q_{3,1} & q_{3,2} & q_{3,3} & q_{3,4} & q_{3,5} & q_{3,6} & q_{3,7} & q_{3,8} \\ & & & \ldots & \ldots & & & \\ q_{8,1} & q_{8,2} & q_{8,3} & q_{8,4} & q_{8,5} & q_{8,6} & q_{8,7} & q_{8,8} \end{bmatrix} \begin{bmatrix} r_{1,1} & r_{1,2} & r_{1,3} & r_{1,4} & r_{1,5} & r_{1,6} & r_{1,7} & r_{1,8} \\ r_{2,1} & r_{2,2} & r_{2,3} & r_{2,4} & r_{2,5} & r_{2,6} & r_{2,7} & r_{2,8} \\ r_{3,1} & r_{3,2} & r_{3,3} & r_{3,4} & r_{3,5} & r_{3,6} & r_{3,7} & r_{3,8} \\ & & & \ldots & \ldots & & & \\ r_{8,1} & r_{8,2} & r_{8,3} & r_{8,4} & r_{8,5} & r_{8,6} & r_{8,7} & r_{8,8} \end{bmatrix}$$

$$A = \begin{bmatrix} q_{1,1}r_{1,1} & q_{1,1}r_{1,2} + q_{1,2}r_{2,2} & \ldots & q_{1,1}r_{1,8} + q_{1,2}r_{2,8} + \ldots + q_{1,5}r_{5,8} + q_{1,6}r_{6,8} + q_{1,7}r_{7,8} + q_{1,8}r_{8,8} \\ q_{2,1}r_{1,1} & q_{2,1}r_{1,2} + q_{2,2}r_{2,2} & \ldots & q_{2,1}r_{1,8} + q_{2,2}r_{2,8} + \ldots + q_{2,5}r_{5,8} + q_{2,6}r_{6,8} + q_{2,7}r_{7,8} + q_{2,8}r_{8,8} \\ q_{3,1}r_{1,1} & q_{3,1}r_{1,2} + q_{3,2}r_{2,2} & \ldots & q_{3,1}r_{1,8} + q_{3,2}r_{2,8} + \ldots + q_{3,5}r_{5,8} + q_{3,6}r_{6,8} + q_{3,7}r_{7,8} + q_{3,8}r_{8,8} \\ & & \ldots & \\ q_{8,1}r_{1,1} & q_{8,1}r_{1,2} + q_{8,2}r_{2,2} & \ldots & q_{8,1}r_{1,8} + q_{8,2}r_{2,8} + \ldots + q_{8,5}r_{5,8} + q_{8,6}r_{6,8} + q_{8,7}r_{7,8} + q_{8,8}r_{8,8} \end{bmatrix} \qquad (4)$$

It can be seen from equations (3) and (4) that the element $a_{1,1}$ of the matrix A ($a_{1,1}$ is an element that is located in the first row and the first column of the matrix A) is equal to $q_{1,1}r_{1,1}$. Change of the value of $r_{1,1}$ thus effects $a_{1,1}$ directly, but change of the value of $r_{1,8}$ only effects $a_{1,8}$ indirectly. Therefore, in some example embodiments, compared with $r_{1,1}$, the location of $r_{1,8}$ is a better embedding position to minimize influence on a host image and achieve good ability against attacks such as image impression or noises.

As shown in FIG. 4, the horizontal axis denotes different attacks including JPG attack, JPG2000 attack, Gaussian noise, and Salt & Peppers noise. The vertical axis denotes normalized correction (NC) that is adopted to evaluate similarities between an original watermark image or secret image and an extracted watermark image or retrieved secret image. For example, higher NC value indicates better robustness.

As shown in FIG. 4, among the four positions in the first row, $r_{1,1}$ and $r_{1,8}$ are best positions against the example attacks. $r_{1,1}$ is better for noise attack, and $r_{1,8}$ has better performance when facing JPG or JPG2000 attack or compression.

Figure 5:
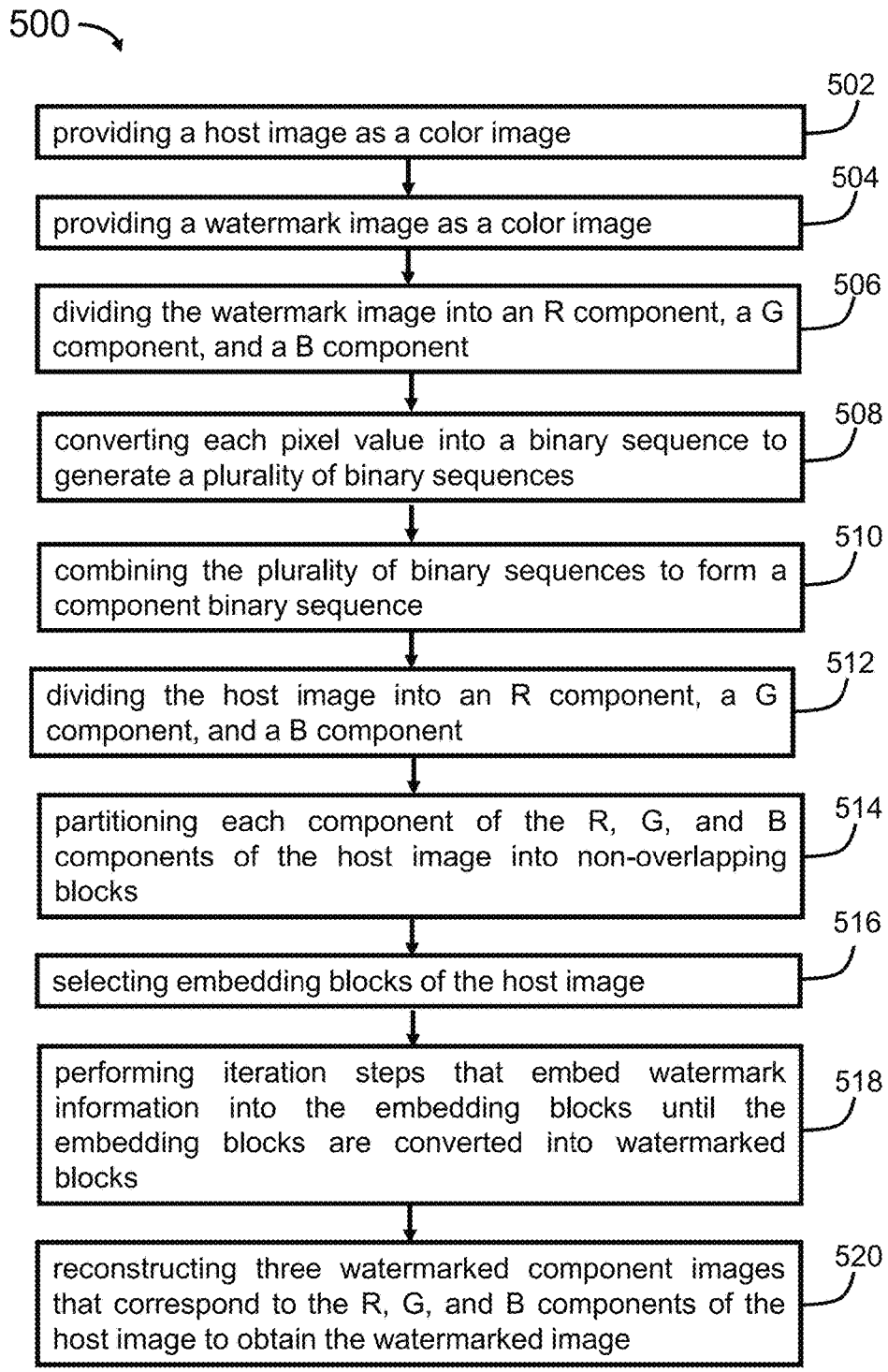
FIG. 5 shows a method to embed a watermark image into a host image in accordance with an example embodiment.

FIG. 5 shows a method 500 to embed a watermark image into a host image in accordance with an example embodiment.

The method 500 can be executed by a computer or an apparatus that incorporates a computer. The computer includes electronic devices such as a computer system or electronic system, wearable electronic devices, servers, portable electronic devices, handheld portable electronic devices, and hardware (e.g., a processor, processing unit, digital signal processor, controller, memory, etc.).

Block 502 states providing a host image as a color image. As an example, the host image is a 24-bit color image with size of 1024×1024.

Block 504 states providing a watermark image as a color image. As an example, the watermark image is a 24-bit color image with size of 32×32. A color watermark image has more information than a grey watermark image has. For example, the watermark information of a 24-bit color image is 24 times more than that of a binary image with the same size.

At Block 506, the watermark image is divided into an R component, a G component, and a B component.

At Block 508, each pixel value is converted into a binary sequence to generate a plurality of binary sequences.

Each component of the R, G, and B components of the watermark image includes a plurality of pixels and each pixel corresponds to a pixel value. By way of example, for the R component of the watermark image, each pixel value is converted into a binary sequence such as an 8-bit binary sequence such that a plurality of binary sequences for the R component are generated or created. Similar process is conducted or done for the G component and the B component respectively. As a result, there are three sets of a plurality of binary sequences that correspond to the R, G, and B components of the watermark image respectively.

In an example embodiment, to improve safety, each component of the R, G, and B of the watermark image is permuted by Arnold transformation with private keys $KA_i$ (i=1,2,3) before converting each pixel value into a binary sequence.

At Block 510, the plurality of binary sequences is combined to form a component binary sequence.

By way of example, for the set of a plurality of binary sequences that corresponds to the R component of the watermark image, the plurality of binary sequences are combined to form a component binary sequence that corresponds to the R component. Similar process is conducted for the G component and the B component respectively. Thus, three component binary sequences are generated or formed that correspond to the R, G, and B components of the watermark image respectively.

At Block 512, the host image is divided into an R component, a G component, and a B component.

At Block 514, each component of the R, G, and B components of the host image is partitioned or sub-divided into non-overlapping blocks or non-uniform sub regions.

By way of example, this action can be executed with adaptive partition, adaptive subdivision or non-uniform rectangular partition or adaptive rectangular non-uniform partition or non-uniform subdivision treatment as stated above. In an example embodiments, the results of the partition process are saved or stored into an array RNO. By way of example, the results include pixel locations X and Y, blocks' width W and height H for the non-overlapping blocks.

At Block 516, embedding blocks of the host image are selected to embed watermark information.

When a color watermark image is embedded into a host image, all three components (e.g., R, G, and B components) of the host image are selected for embedding watermark information. For each component of the R, G, and B components of the host image, a set of or a plurality of embedding blocks are selected such that watermark information of corresponding component of the watermark image is embedded. For example, embedding blocks of the R component of the host image are selected to embed watermark information of the R component of the watermark image.

In an example embodiment, for each component of the R, G, and B components of the host image, a random non-collision sequence is generated that indicates order of embedding blocks that watermark information is embedded.

By way of example, to resist Geometric attacks, a size of(length×8) random non-collision sequence S is generated or created to indicate order for the embedding blocks, wherein the length is equal to the total length of the three component binary sequences as stated with reference to Block 510. In some example embodiments, the sequence S is used as digital signature that can be programed to include user right information.

At Block 518, iteration steps are performed that embed watermark information into the embedding blocks until all embedding blocks are converted into watermarked blocks.

By way of example, an R component of the host image includes a plurality of embedding blocks that are selected with reference to Block 516. Iteration steps are performed such that each of the plurality of embedding blocks is converted into a watermarked block. As a result, a watermarked component image for the R component of the host image is formed that includes the watermarked blocks. Iteration steps are similarly conducted or performed for the G component and the B component of the host image to generate another two watermarked component images that correspond to the G component and the B component respectively.

Take the R component of the host image as an example for illustrative purpose only. Example iteration steps include: (1) decomposing an embedding block of the R component with QR decomposition to obtain a matrix R and a matrix Q, wherein the matrix R is an upper triangular matrix and the matrix Q is an orthogonal matrix; (2) embedding, for the embedding block, watermark information or data into the matrix R; (3) conducting an inverse QR operation for the embedding block to obtain a watermarked block; and (4) moving to next embedding block and performing steps (1-4) iteratively until all the embedding blocks for the R component are converted into watermarked blocks such that a watermarked component image for the R component is generated. Iteration steps are also performed for the G and B component of the host image.

As an example, the watermark information or data is a watermark bit that can be 0 or 1. By way of example, iteration steps embed watermark information or data into the element of first row and last column of the matrix R for each embedding block. In an example embodiment, taking the R component of the host image as an example for illustrative purpose only, the iteration steps includes:
  (a) calculating, based on the array RNO, an area size RCOUNT of an embedding block;
  (b) calculating, for the embedding block, quantization step Δ with equation (5):

$$\Delta = 0.01 + RCOUNT \times a/16 \quad (5)$$

wherein a is a coefficient of x in a bivariate piecewise polynomial or approximate polynomial f(x,y) that is used for the non-uniform subdivision treatment as stated above;
  (c) determining, based on watermark information or watermark bit w and for the embedding block, modifying values T1 and T2 with equations (6) and (7):

$$\text{if } w = 0, \begin{cases} T_1 = -0.5\Delta \\ T_2 = 1.5\Delta \end{cases}, \quad (6)$$

$$\text{if } w = 1, \begin{cases} T_1 = 0.5\Delta \\ T_2 = -1.5\Delta \end{cases}; \quad (7)$$

(d) determining, for the embedding block, quantization results $C_1$ and $C_2$ with equations (8) and (9):

$$C_1 = 2k\Delta + T_1 \quad (8)$$

$$C_2 = 2k\Delta + T_2 \quad (9),$$

wherein $$k = \text{floor}\left(\text{ceil}\left(\frac{r_{1,col}}{\Delta}\right)/2\right),$$

and $r_{1,col}$ is an element of a matrix R in the first row and the col column, col is number of largest column for the matrix R, wherein the matrix R is an upper triangular matrix and is derived from decomposition of the embedding block with QR decomposition, and floor(x) is largest integer less than or equal to x, and ceil (x) is smallest integer greater than or equal to x;
  (e) calculating, for the embedding block, an element $r'_{1,col}$ with equation (10):

$$r'_{1,col} = \begin{cases} C_2, & \text{if } \text{abs}(r_{1,col} - C_2) < \text{abs}(r_{1,col} - C_1) \\ C_1, & \text{else} \end{cases}, \quad (10)$$

wherein abs(x) is absolute value of x;
  (f) replacing, for the embedding block, $r_{1,col}$ with $r'_{1,col}$ in the matrix R to obtain a matrix R';
  (g) conducting, for the embedding block, an inverse QR operation (e.g. Q×R') to obtain a watermarked block; and
  (h) moving to next embedding block.

Steps (a-h) are performed iteratively until all the embedding blocks for the R component are converted into watermarked blocks such that a watermarked component image for the R component is generated. Iteration steps are also performed for the G and B component of the host image to obtain another two watermarked component images that correspond to the G component and the B component respectively.

At Block 520, the three watermarked component images that correspond to the R, G, and B components of the host image are reconstructed such that the watermark image is embedded into the host image to obtain the watermarked image.

Figure 6:
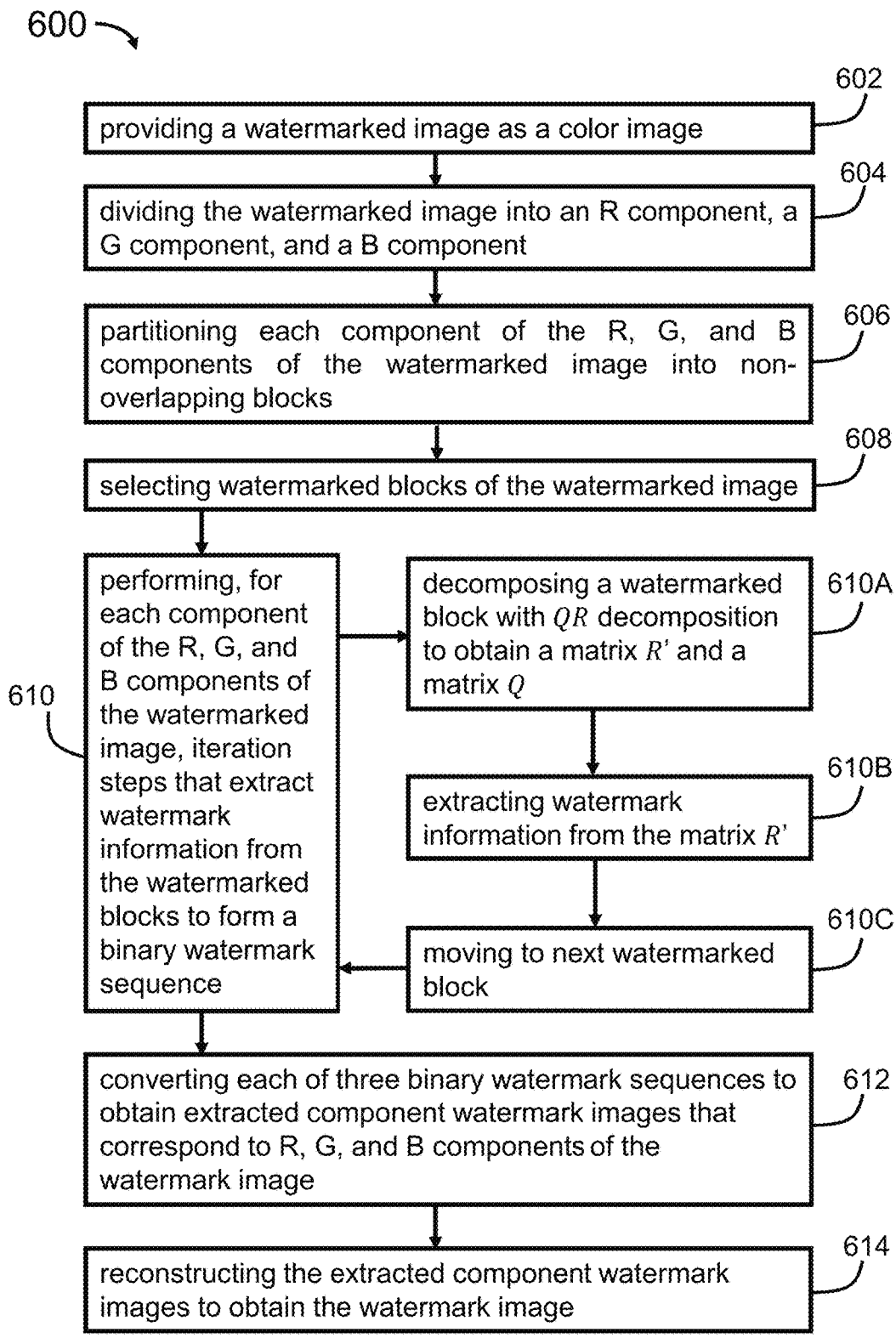
FIG. 6 shows a method to extract a watermark image from a watermarked image in accordance with an example embodiment.

FIG. 6 shows a method 600 to extract a watermark image from a watermarked image in accordance with an example embodiment. The method 600 extract a watermark image without necessity of knowing an original host image and an original watermark image and thus achieves blind extraction.

The method 600 can be executed by a computer or an apparatus that incorporates a computer. The computer includes electronic devices such as a computer system or electronic system, wearable electronic devices, servers, portable electronic devices, handheld portable electronic devices, and hardware (e.g., a processor, processing unit, digital signal processor, controller, memory, etc.).

Block 602 states providing a watermarked image as a color image. As an example, the watermarked image is a 24-bit color image.

At Block 604, the watermarked image is divided into an R component, a G component, and a B component.

At Block 606, each component of the R, G, and B components of the watermarked image is partitioned or sub-divided into non-overlapping blocks or non-uniform sub regions.

By way of example, this action can be done with adaptive partition, or adaptive subdivision or non-uniform rectangular partition or adaptive rectangular non-uniform partition or non-uniform subdivision treatment as stated above. In an example embodiments, the results of the partition process are saved or stored into an array RNO'. By way of example, the results include pixel locations X' and Y', blocks' width W' and height H' for the non-overlapping blocks.

At Block 608, watermarked blocks of the watermarked image are selected to extract watermark information.

When extracting a watermark image from a watermarked image, all three components of the watermarked image (e.g. R, G, and B components) are selected for extracting watermark information or data. For each component of the R, G, and B components of the watermarked image, a set of or a plurality of watermarked blocks are selected such that watermark information of corresponding component of the watermark image is extracted. For example, a plurality of watermarked blocks of the R component of the watermarked image are selected to extract watermark information of the R component of the watermark image.

In an example embodiment, for each component of the R, G, and B components of a watermarked image, a random non-collision sequence is used to indicate order of watermarked blocks that watermark information is extracted. For example, the random non-collision sequence can be a sequence S as stated with reference to FIG. 5.

At Block 610, for each component of the R, G, and B components of the watermarked image, iteration steps are performed that extract watermark information from the watermarked blocks to form a binary watermark sequence.

By way of example, the R component of the watermarked image includes a plurality of watermarked blocks that are selected with reference to Block 608. Iteration steps are performed such that watermark information is extracted from each of the plurality of watermarked blocks. As a result, a binary watermark sequence for the R component of the watermarked image is formed or created. Iteration steps are similarly conducted for the G component and the B component of the watermarked image to generate another two binary watermark sequences.

The iteration steps with reference to Block 610 include three sub-steps as shown in Blocks 610A-610C.

Block 610A states decomposing a watermarked block with QR decomposition to obtain a matrix R' and a matrix Q. Block 610B states extracting watermark information from the matrix R'. Block 610C states moving to next watermarked block. Blocks 610A-610C are Iteratively performed until all watermark information is extracted from each component of the R, G, and B components of the watermarked image to form a binary watermark sequence such that three binary watermark sequences are generated as a result.

In some example embodiments, taking the R component of the watermarked image as an example for illustrative purpose only, the iteration steps includes:

(a) calculating, based on the array RNO', an area size RCOUNT' of a watermarked block;

(b) calculating, for the watermarked block, quantization step Δ for the watermarked block with equation (11):

$$\Delta' = 0.01 + RCOUNT' \times \frac{a'}{16}; \qquad (11)$$

wherein a' is coefficient of x in a bivariate piecewise polynomial or approximate polynomial (x, y) that is used to partition the watermarked image such as in a non-uniform subdivision treatment;

(c) determining, by the computer system and for the watermarked block, watermark information w' with equation (12):

$$w' = \mod\left(ceil\left(\frac{r'_{1,col}}{\Delta}\right), 2\right) \qquad (12)$$

wherein mod( ) is the modulo operation, and cell (x) is smallest integer greater than or equal to x, and $r'_{1,col}$ is an element of the matrix R' in the first row and the col' column, and col' is number of largest column for the matrix R'; and (d) moving to next watermarked block.

Steps (a-d) are performed iteratively until watermark information is extracted from all the watermarked blocks for the R component such that a binary watermark sequence for the R component is generated. These iteration steps are also performed for the G and B component of the watermarked image. As a results, three binary watermark sequences are obtained. As an example, the watermark information or data is a watermark bit that can be 0 or 1.

At Block 612, each of three binary watermark sequences is converted to obtain extracted component watermark images that correspond to R, G, and B components of the watermark image.

For example, a binary watermark sequence that is generated from processing the R component of the watermarked image is converted such that an extracted component watermark image that correspond to the R component of the watermark image is obtained or generated.

In some example embodiments, the binary watermark sequence for the R component of the watermark image is divided into a plurality of groups such as 8-bit groups, and each group is converted into a decimal pixel value. This process is also performed for the binary watermark sequences for the G and B components of the watermark image respectively.

At Block 614, the three extracted component watermark images are reconstructed to obtain a watermark image such that the watermark image is extracted.

In an example embodiment, an inverse Arnold transformation is conducted with private keys for each of the extracted component watermark images before being reconstructed to obtain the watermark image.

Figure 7:
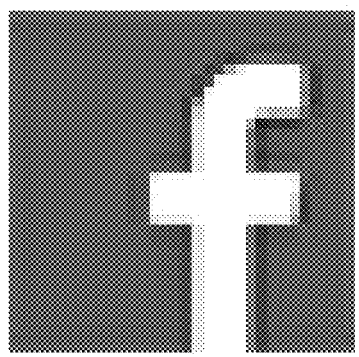
FIG. 7 shows a color watermark image in accordance with an example embodiment.

FIG. 7 shows a color watermark image 700 in accordance with an example embodiment. For example, the color watermark image 700 is a 24-bit color image with size of 32×32. The color watermark image 700 can be embedded into a 24-bit host image with size of 1024×1024 from a large-scale image database CVG-UGR.

FIG. 8A-8F shows six test images 810-860 in accordance with an example embodiment. As an example, the six test images 810-860 are called Lena, Avion, Peppers, Hsewoods, House, and Ivytree respectively. By way of example, each of the six test images 810-860 has a size of 1024×1024.

Figure 8A:
FIGS. 8A-8F show six test images in accordance with an example embodiment.
Figure 8B:
Figure 8C:
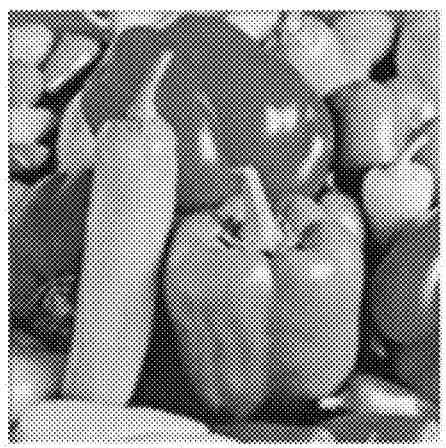
Figure 8D:
Figure 8E:
Figures 8F, 9:
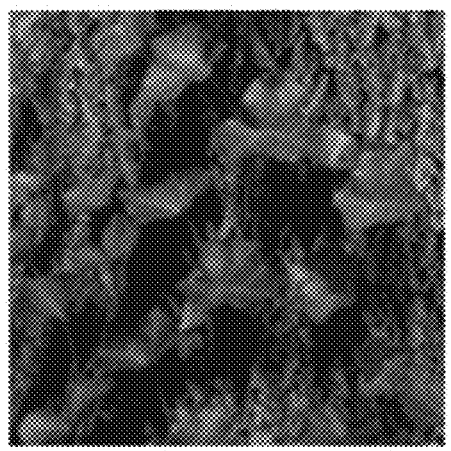
FIG. 9 shows a table illustrating attacks used in experiments in accordance with an example embodiment.

FIG. 9 shows a table 900 illustrating attacks used in experiments in accordance with an example embodiment.

By way of example, common image-manipulation attacks or image attacks or attacks include noise addition, JPEG compression, and JPEG 2000 compression. Scaling and cropping are performed for evaluating robustness as stated below. FIG. 9 shows eleven kinds of attacks in total. Detail description of these attacks is given as follows:

Salt-and-pepper noise addition: 2% and 10% impulsive salt-and-pepper noise are added to the test images as shown in FIGS. 8A-8F respectively;

Gaussian noise addition: 2% and 10% impulsive Gaussian noise are added to the test images respectively;

JPEG compression: the test images are compressed by JPEG with a quality factor of 30 and 90 respectively;

JPEG 2000 compression: the test images are compressed by JPEG 2000 with a quality factor of 20 and 50 respectively;

Scaling: the test images are scaled by four times; and

Cropping: the test images are cropped by 25 percent and 50 percent respectively.

In some example embodiments, for quantitative evaluation of robustness, two similarity measurements, peak signal-to-noise ratio (PSNR) and normalized correlation (NC) are adopted to evaluate performance of methods in accordance with example embodiments (hereinafter called "Proposed"). By way of example, PSNR is used to evaluate quality difference between an original host image and a watermarked image that is derived or obtained from the host image with a watermark image embedded. For example, a larger PSNR indicates the watermarked image resembles the original host image more closely, which indicates the watermarking method makes the watermark image more imperceptible. By way of example, PSNR is defined by following formula:

$$PSNR = 10\log_{10}\frac{255^2}{MSE}(dB) \qquad (13)$$

wherein MSE is a mean-square error between a host image and a watermarked image or attacked image. By way of example, for an M×N image, MSE is calculated by:

$$MSE = \frac{1}{M \times N}\sum_{i=1}^{M}\sum_{j=1}^{N}(H_{i,j} - H^A_{i,j})^2 \qquad (14)$$

wherein $H_{i,j}$ and $H_{i,j}{}^A$ denote the original host image and the watermarked image or embedded image respectively.

Lower PSNR value indicates more severe damage that is caused by one or more attacks, and high PSNR value suggests or indicates stronger imperceptible capability. In some example embodiments, the NC defined in equation (15) is adopted to evaluate the similarity between an original secret image or watermark image and a retrieved secret image or extracted watermark image. Higher NC value indicates better robustness and better copyright protection scheme.

$$NC = \frac{\sum_{i=1}^{n}\sum_{j=1}^{n}\overline{S_{i,j} \oplus S_{i,j}^{R}}}{n \times n} \quad (15)$$

Figures 10, 11A:
FIG. 10 shows a table illustrating performance comparison between example methods in accordance with an example embodiment and another three prior art methods.
FIGS. 11A-11K show test images after different attacks in accordance with an example embodiment.

FIG. 10 shows a table 1000 illustrating performance comparison between example methods in accordance with an example embodiment and another three prior art methods.

As shown in FIG. 10, watermarked images are Lena and Avion respectively as example. The watermark image is an image as shown in FIG. 7 as example. Watermarked images, and extracted watermark or extracted watermark images are shown to illustratively compare the four methods in terms of PSNR and NC values, wherein:

Proposed: also called example methods, referring to one or more methods used in accordance with example embodiments as stated above; and The three prior art methods are as follows:
(1) Yashar [30]: the method used in "S. Hosseini-Khayat, Y. Naderahmadian, Fast Watermarking Based on QR Decomposition in Wavelet Domain, Intelligent Information Hiding and Multimedia Signal Processing, International Conference on (2010) 127-130";
(2) Su schur [16]: the method used in "S. Qingtang, N. Yugang, L. Xianxi, Z. Yu, Embedding Color Watermarks in Color Images Based on Schur Decomposition, Optics Communica-tions 285 (7) (2012) 1792-1802"; and
(3) Su qr [17]: the method used in "Q. Su, Y. Niu, G. Wang, S. Jia, J. Yue, Color Image Blind Watermarking Scheme Based on QR Decomposition, Signal Processing 94(1)".

FIG. 10 shows PSNR and NC values for each method. As shown, the method of "Proposed" has higher peak signal to noise ratio, which indicates that methods in accordance with example embodiment as stated above have stronger imperceptible capability.

FIG. 11A-11K show test images 1110-1194 after different attacks in accordance with an example embodiment. All the test images 1110-1194 are Lena images. The attacks for the test images 1110-1194 correspond to the eleven attacks respectively as shown in FIG. 9.

Figure 11B:
Figure 11C:
Figure 11D:
Figure 11E:
Figure 11F:
Figure 11G:
Figure 11H:
Figure 11I:
Figure 11J:
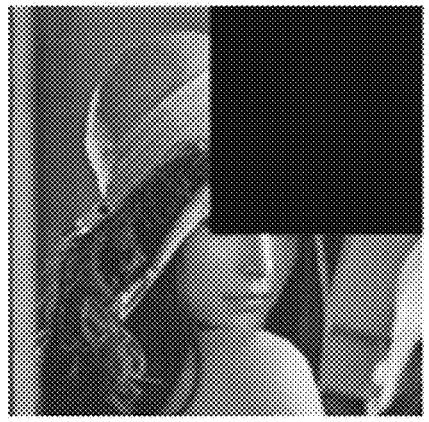
Figures 11K, 12A:
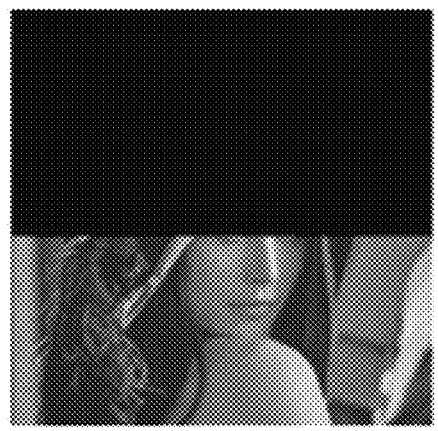
FIG. 12A shows a table illustrating extracted watermark images that are extracted with one or more methods in accordance with an example embodiment and another three prior art methods.

FIG. 12A shows a table 1210 illustrating extracted watermark images that are extracted with one or more methods in accordance with an example embodiment and another three prior art methods respectively. These extracted watermark images are extracted from test images (i.e. Lena images) that are attacked respectively by the eleven attacks respectively as shown in FIG. 9. Attack Index in FIG. 12A refers to same attack in FIG. 9 if the index number is same, which is also applicable to FIGS. 12B-14B.

FIG. 12B shows a table 1220 illustrating extracted watermark images that are extracted with one or more methods in accordance with an example embodiment and another three prior art methods respectively. These extracted watermark images are extracted from test images (i.e. Avion images) that are attacked respectively by the eleven attacks respectively as shown in FIG. 9.

Figure 13A:
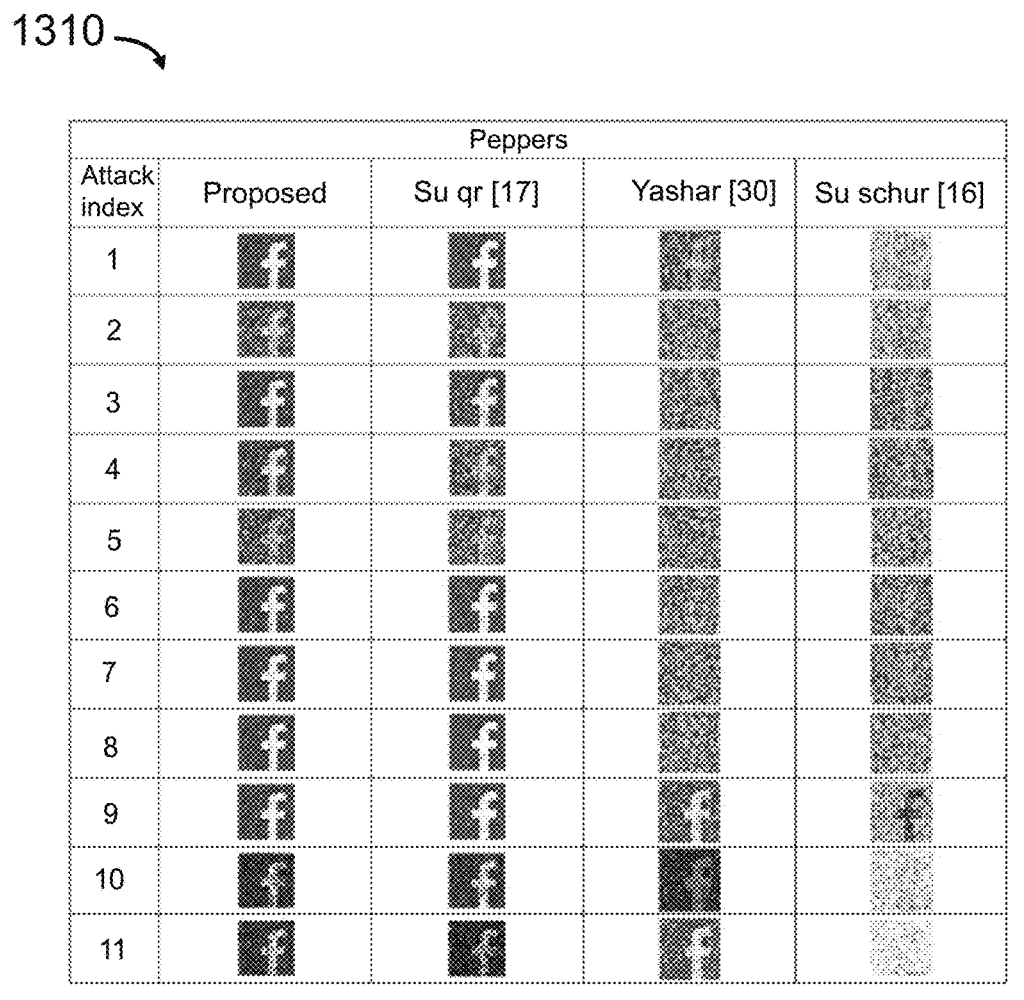

FIG. 13A shows a table 1310 illustrating extracted watermark images that are extracted with one or more methods in accordance with an example embodiment and another three prior art methods respectively. These extracted watermark images are extracted from test images (i.e. Peppers images) that are attacked respectively by the eleven attacks respectively as shown in FIG. 9.

Figure 13B:
FIG. 13B shows a table illustrating extracted watermark images that are extracted with one or more methods in accordance with an example embodiment and another three prior art methods.
Figure 15A:
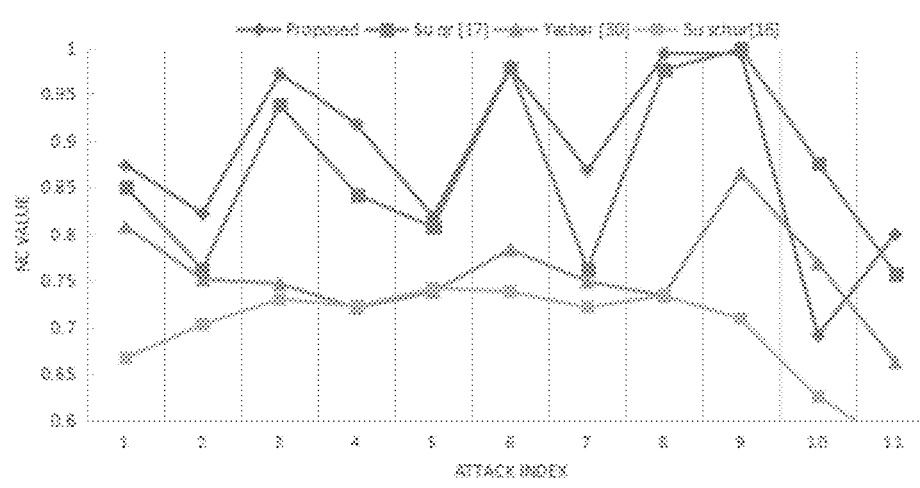
FIGS. 15A-15F show graphs illustrating comparisons of robustness (NC values) between example methods in accordance with an example embodiment and another three prior art methods.
Figure 15B:
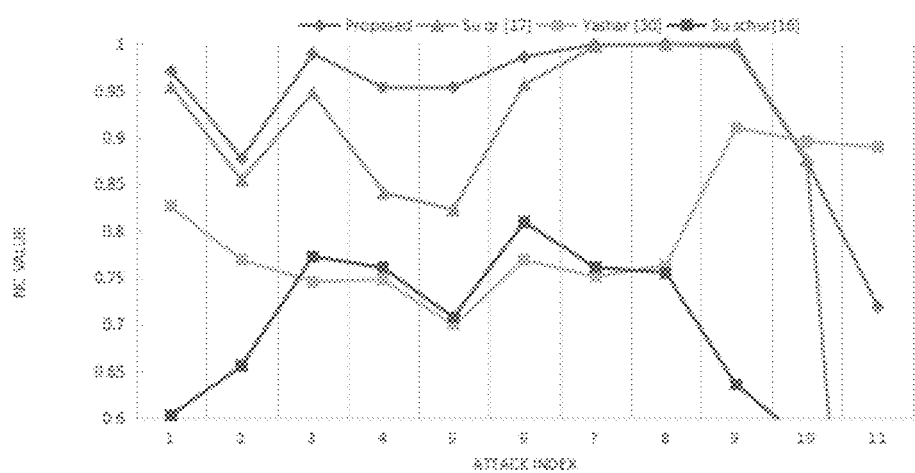
Figure 15C:
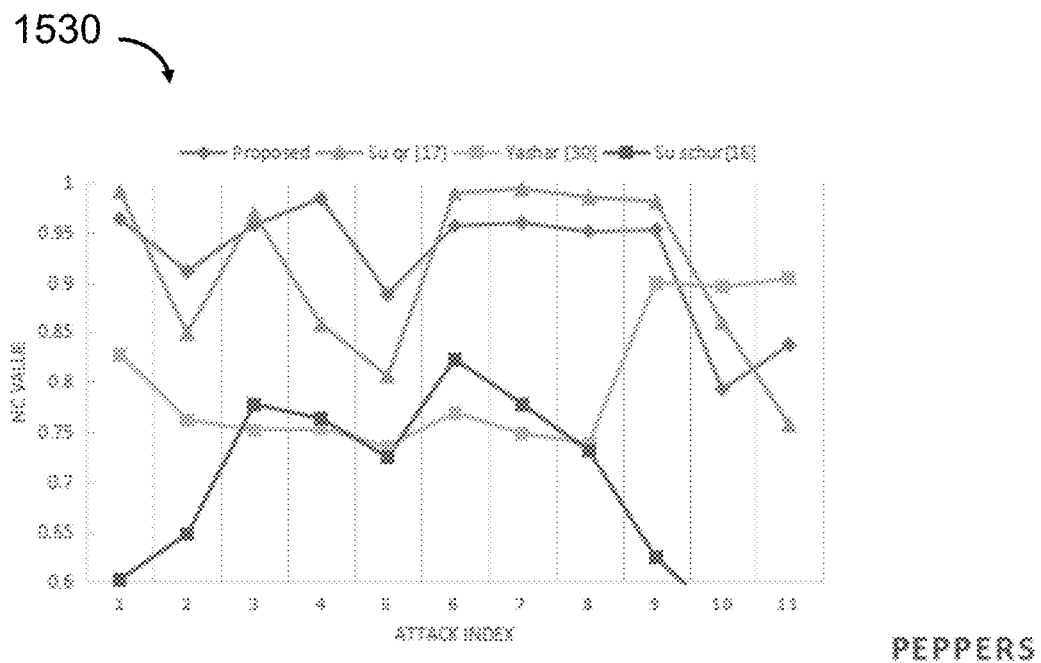
Figure 15D:
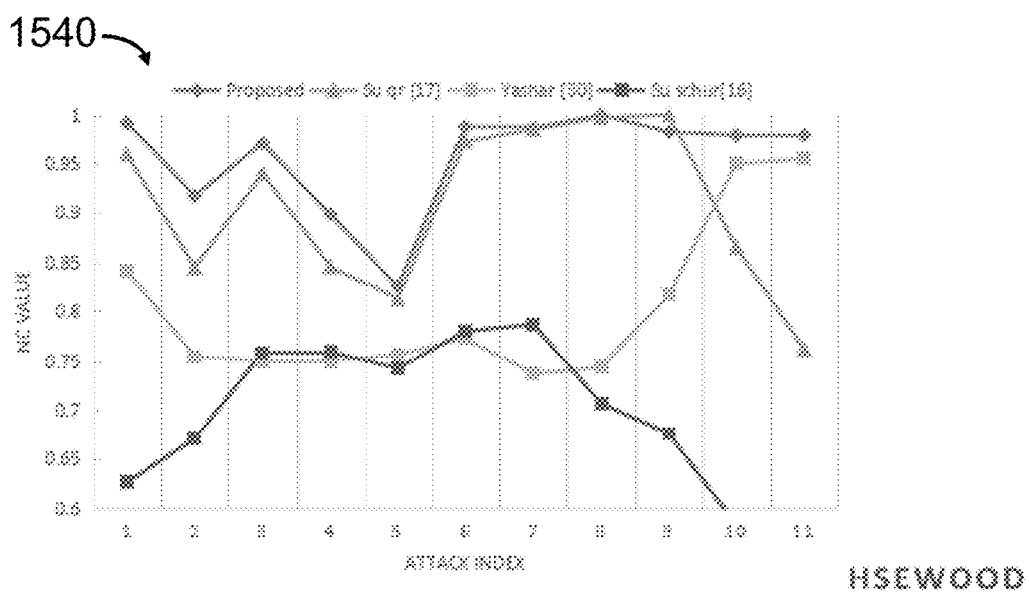
Figure 15E:
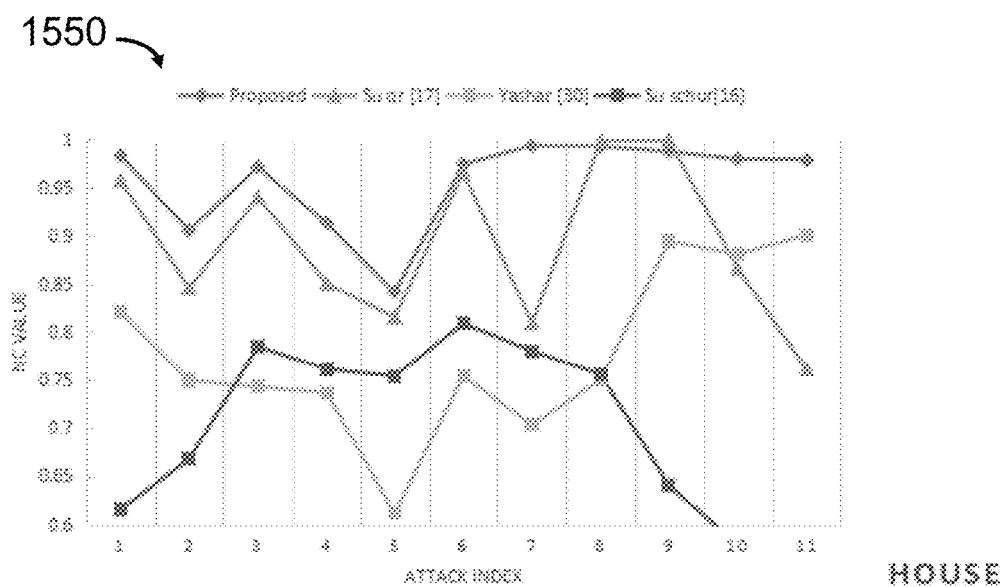
Figure 15F:
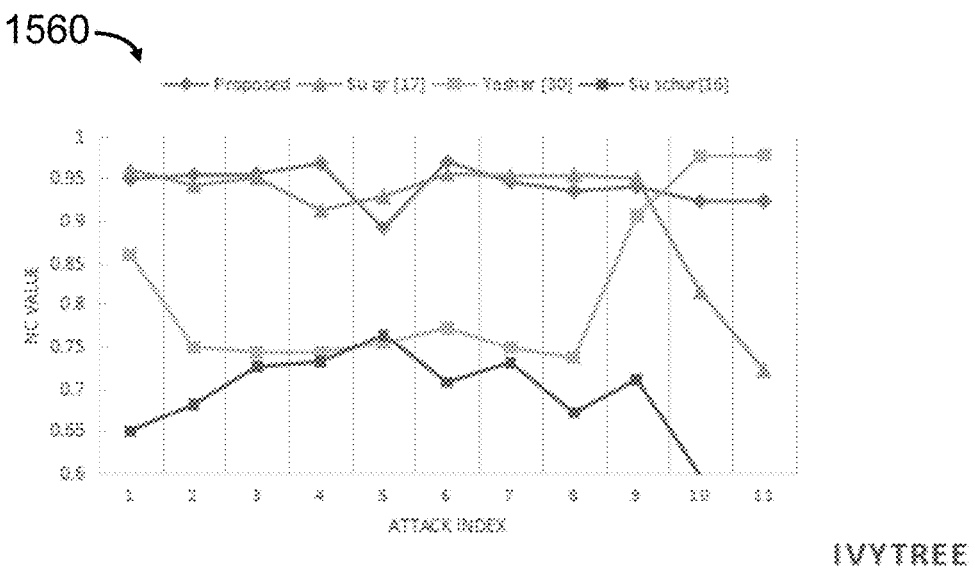

FIG. 13B shows a table 1320 illustrating extracted watermark images that are extracted with one or more methods in accordance with an example embodiment and another three prior art methods respectively. These extracted watermark images are extracted from test images (i.e. Hsewoods images) that are attacked respectively by the eleven attacks respectively as shown in FIG. 9.

FIG. 14A shows a table 1410 illustrating extracted watermark images that are extracted with one or more methods in accordance with an example embodiment and another three prior art methods respectively. These extracted watermark images are extracted from test images (i.e. House images) that are attacked respectively by the eleven attacks respectively as shown in FIG. 9.

FIG. 14B shows a table 1420 illustrating extracted watermark images that are extracted with one or more methods in accordance with an example embodiment and another three prior art methods respectively. These extracted watermark images are extracted from test images (i.e. Ivytree images) that are attacked respectively by the eleven attacks respectively as shown in FIG. 9.

As shown in FIGS. 12-14, the "Proposed" or example methods in accordance with example embodiments obtains clearer extracted watermark images than prior art methods such as Su qu [17], Yashar [30] and Su schur [16] when facing attacks such as adding noise, compression, scaling and cropping.

FIGS. 15A-15F show graphs 1510-1560 illustrating comparisons of robustness (NC values) between the "Proposed" or example methods in accordance with an example embodiment and another three prior art methods respectively.

As shown in FIGS. 15A-15F, most of the value for the "Proposed" or example methods are higher than another three prior art methods, which suggests that the "Proposed" or example methods in accordance with an example embodiment have stronger robustness. The "Proposed" or example methods in accordance with an example embodiment also have better performance when facing the adding noise attack.

FIG. 16 shows a table 1600 illustrating experimental results of replacement key and selection sequence in accordance with an example embodiment.

A replacement key or secret key (such as private keys $KA_j$ as stated with reference to FIGS. 5 and 6) facilitates confidentiality of an algorithm or method, and a selection sequence can enhance the security of watermarking including watermark embedding and extracting. Only replacing the key and choosing the right time, the watermarking of target in the same time-series can be obtained. Otherwise, it is unable to get or determine whether there is a watermarking or not. This would greatly improve the security of the watermarking process. At same time, the selected block sequence is kept as a digital signature, which increases watermarking safety.

FIG. 17 shows a table 1700 illustrating comparison of capacity between one or more methods in accordance with an example embodiment and another three prior art methods respectively.

As shown in FIG. 17, the "Proposed" or example methods in accordance with an example embodiment have greater capacity than another three prior art methods, which indicates the "Proposed" or example methods enable more information to be stored.

Figure 18:
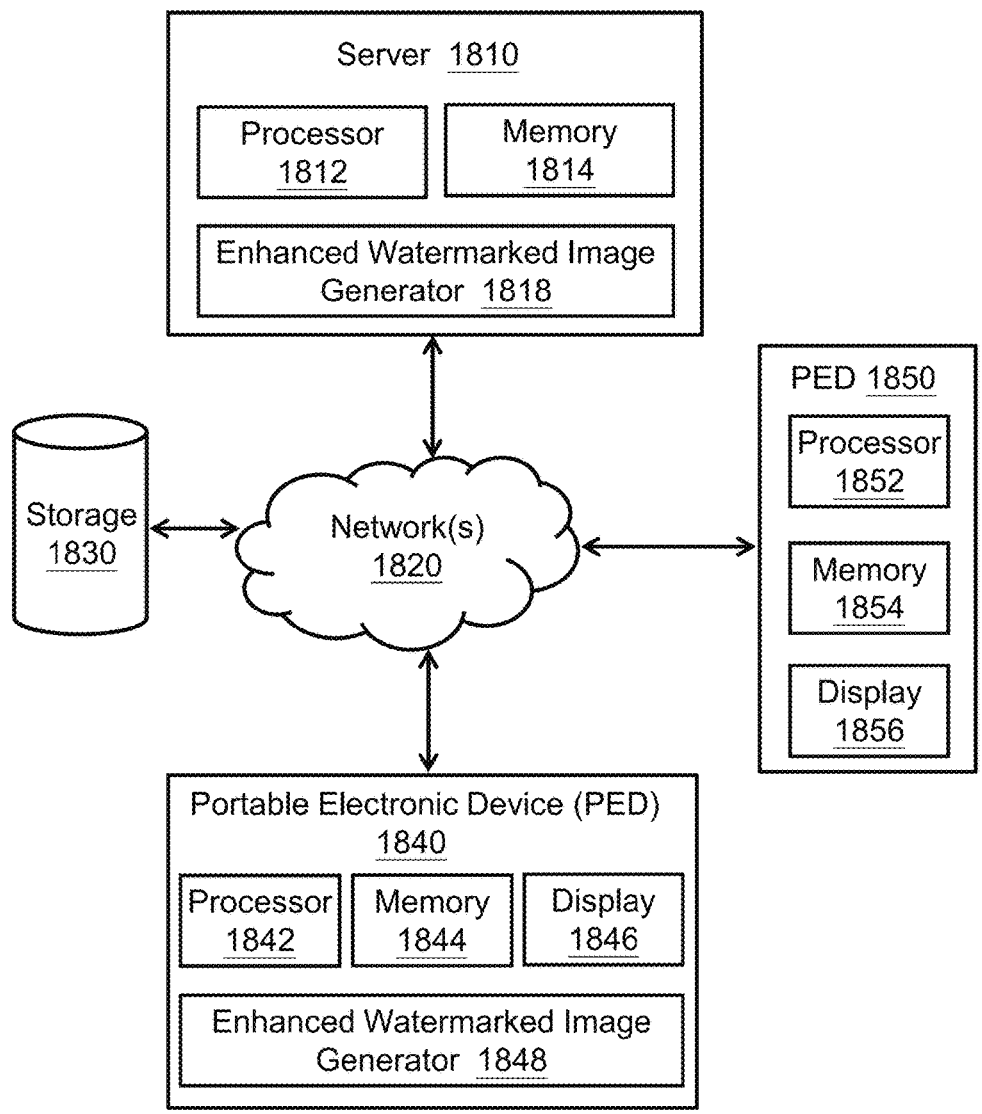
FIG. 18 shows a computer system in accordance with an example embodiment.

FIG. 18 shows a computer system or electronic system in accordance with an example embodiment. The computer system 1800 includes one or more computers or electronic devices (such as one or more servers) 1810 that includes a processor or processing unit 1812 (such as one or more processors, microprocessors, and/or microcontrollers), one or more components of computer readable medium (CRM) or memory 1814, and an enhanced watermarked image generator 1818.

The memory 1814 stores instructions that when executed cause the processor 1812 to execute a method discussed herein and/or one or more blocks discussed herein. The enhanced watermarked image generator 1818 is example of specialized hardware and/or software that assist in improving performance of a computer and/or execution of a method discussed herein and/or one or more blocks discussed herein. Example functions of a performance enhancer are discussed in connection with FIGS. 5 and 6.

In an example embodiment, the computer system 1800 includes a storage or memory 1830, a portable electronic device or PED 1840 in communication over one or more networks 1820.

The storage 1830 can include one or more of memory or databases that store one or more of image files, audio files, video files, software applications, and other information discussed herein. By way of example, the storage 1830 store image, instructions or software application that are retrieved by the server 1810 over the network 1820 such that a method discussed herein and/or one or more blocks discussed herein are executed.

The PED 1840 includes a processor or processing unit 1842 (such as one or more processors, microprocessors, and/or microcontrollers), one or more components of computer readable medium (CRM) or memory 1844, one or more displays 1846, and an enhanced watermarked image generator 1848.

The PED 1840 can execute a method discussed herein and/or one or more blocks discussed herein and display an image (such as a watermark image, a host image, and a watermarked image) for review. Alternatively or additionally, the PED 1840 can retrieve files such as images and software instructions from the storage 1830 over the network 1820 and execute a method discussed herein and/or one or more blocks discussed herein.

In an example embodiment, the computer system 1800 includes a PED 1850 that includes a processor or processing unit 1852 (such as one or more processors, microprocessors, and/or microcontrollers), one or more components of computer readable medium (CRM) or memory 1854, and one or more displays 1856.

By way of example, the PED 1850 communicates with the server 1810 and/or the storage 1830 over the network 1820 such that a method discussed herein and/or one or more blocks discussed herein is executed by the server 1810 and results are sent back to the PED 1850 for output, storage and review.

The network 1820 can include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices can couple together via one or more wires, such as a direct wired-connection. As another example, electronic devices can communicate directly through a wireless protocol, such as Bluetooth, near field communication (NFC), or other wireless communication protocol.

In some example embodiments, the methods illustrated herein and data and instructions associated therewith, are stored in respective storage devices that are implemented as non-transitory computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed a processor, controller, and other hardware discussed herein. Furthermore, blocks and/or methods discussed herein can be executed automatically with or without instruction from a user.

The methods in accordance with example embodiments are provided as examples, and examples from one method should not be construed to limit examples from another method. Figures and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

As used herein, the term "watermarking" refers to a process of hiding information in a carrier signal or image as well as a process of extracting information from a carrier signal or image with hidden information. The hidden information may, but does not need to, include a relation to the carrier signal or image.

As used herein, the term "watermark image" refer to an image that is to be embedded into a host image or carrier image. A watermark image, when embedded into a host image, may be used to verify the authenticity or integrity of the host image or to show the identity of its owner(s).

As used herein, the term "host image" refer to an image into which a watermark image is to be embedded.

As used herein, the term "watermarked image" refer to a host image that has a watermark image embedded.

What is claimed is:

1. A method that is executed by a computer system to embed a watermark image into a host image to generate a watermarked image, the method comprising:
   providing the host image as a color image;
   providing the watermark image as a color image;
   dividing, by the computer system, the watermark image into an Red (R) component, a Green (G) component, and a Blue (B) component;
   converting, by the computer system and for each component of the R, G, and B components of the watermark image, each pixel value into a binary sequence to generate a plurality of binary sequences for each component of the R, G, and B components of the watermark image;
   combining, by the computer system and for each component of the R, G, and B components of the watermark image, the plurality of binary sequences to form a component binary sequence such that three component binary sequences are formed that correspond to the R, G, and B components of the watermark image;
   dividing, by the computer system, the host image into an R component, a G component, and a B component;
   partitioning, by the computer system, each component of the R, G, and B components of the host image into non-overlapping blocks with a non-uniform subdivision treatment;
   selecting, by the computer system and for each component of the R, G, and B components of the host image, embedding blocks of the host image;
   performing, by the computer system and for each component of the R, G, and B components of the host image, iteration steps that embed watermark information into the embedding blocks until the embedding blocks are converted into watermarked blocks such that a watermarked component image is formed that includes the watermarked blocks; and
   reconstructing, by the computer system, three watermarked component images that correspond to the R, G, and B components of the host image such that the watermark image is embedded into the host image to obtain the watermarked image.

2. The method of claim 1, wherein the iteration steps comprising:
   decomposing, by the computer system, an embedding block with QR decomposition to obtain a matrix R and a matrix Q, wherein the matrix R is an upper triangular matrix and the matrix Q is an orthogonal matrix;
   embedding, by the computer system and for the embedding block, watermark information into the matrix R;
   conducting, by the computer system and for the embedding block, an inverse QR operation to obtain a watermarked block; and
   moving, by the computer system, to next embedding block.

3. The method of claim 1, further comprising:
   storing, by the computer system, results of the partitioning for each component of the R, G, and B components of the host image into an array RNO, wherein the results include pixel locations X and Y, blocks' width W and height H for the non-overlapping blocks; and
   wherein the iteration steps further comprising:
   calculating, by the computer system and based on the array RNO, an area size RCOUNT of the embedding block;
   calculating, by the computer system and for the embedding block, quantization step $\Delta$ with equation (1):

$$\Delta = 0.01 + \text{RCOUNT} \cdot \Delta a / 16 \quad (1),$$

wherein a is a coefficient of x in an approximate polynomial f(x,y) that is used for the non-uniform subdivision treatment;
   determining, by the computer system and based on watermark information w, for the embedding block, modifying values T1 and T2 with equations (2) and (3):

$$\text{if } w = 0, \begin{cases} T_1 = -0.5\Delta \\ T_2 = 1.5\Delta \end{cases}, \quad (2)$$

$$\text{if } w = 1, \begin{cases} T_1 = 0.5\Delta \\ T_2 = -1.5\Delta \end{cases}; \quad (3)$$

determining, by the computer system and for the embedding block, quantization results $C_1$ and $C_2$ with equations (4) and (5):

$$C_1 = 2k\Delta + T_1 \quad (4)$$

$$C_2 = 2k\Delta + T_2 \quad (5),$$

wherein $$k = \text{floor}\left(\text{ceil}\left(\frac{r_{1,col}}{\Delta}\right)/2\right),$$

and $r_{1,col}$ is an element of a matrix R in the first row and the col column, col is number of largest column for the matrix R, wherein the matrix R is an upper triangular matrix and is derived from decomposition of the embedding block with QR decomposition, and floor(x) is largest integer less than or equal to x, and ceil(x) is smallest integer greater than or equal to x;
   calculating, by the computer system and for the embedding block, an element $r'_{1,col}$ with equation (6):

$$r'_{1,col} = \begin{cases} C_2, \text{ if } \text{abs}(r_{1,col} - C_2) < \text{abs}(r_{1,col} - C_1) \\ C_1, \text{ else} \end{cases}, \quad (6)$$

wherein abs(x) is absolute value of x;
   replacing, by the computer system and for the embedding block, $r_{1,col}$ with $r'_{1,col}$ in the matrix R to obtain a matrix R'; and
   conducting, by the computer system and for the embedding block, an inverse QR operation to obtain a watermarked block.

4. The method of claim 1, further comprising:
   generating, by the computer system and for each component of the R, G, and B components of the host image, a random non-collision sequence that indicates order of embedding blocks that watermark information is embedded.

5. The method of claim 1, further comprising:
   permuting, by the computer system, each component of the R, G, and B components for the watermark image using Arnold transformation with private keys.

6. The method of claim 1, wherein both the host image and the watermark image are 24-bit color images.

7. A method that is executed by a computer system to extract a watermark image from a watermarked image to obtain the watermark image, the method comprising:
providing the watermarked image as a color image;
dividing, by the computer system, the watermarked image into an Red (R) component, a Green (G) component, and a Blue (B) component;
partitioning, by the computer system, each component of the R, G, and B components of the watermarked image into non-overlapping blocks;
selecting, by the computer system, watermarked blocks of the watermarked image;
performing, by the computer system and for each component of the R, G, and B components of the watermarked image, iteration steps that extract watermark information from the watermarked blocks to form a binary watermark sequence, the iteration steps including:
decomposing, by the computer system, a watermarked block with QR decomposition to obtain a matrix R' and a matrix Q, wherein the matrix R' is an upper triangular matrix and the matrix Q is an orthogonal matrix;
extracting, by the computer system and for the watermarked block, watermark information from the matrix R'; and
moving, by the computer system, to next watermarked block;
converting, by the computer system, each of three binary watermark sequences to obtain extracted component watermark images that correspond to R, G, and B components of the watermark image; and
reconstructing, by the computer system, the extracted component watermark images to obtain the watermark image such that the watermark image is extracted from the watermarked image.

8. The method of claim 7, further comprising:
storing, by the computer system, results of the partitioning of each component of the R, G, and B components of the watermarked image into an array RNO', wherein the results include pixel locations X' and Y', blocks' width W' and height H' for the non-overlapping blocks; and
wherein the iteration steps further comprising:
calculating, by the computer system and based on the array RNO', an area size RCOUNT' of the watermarked block;
calculating, by the computer system and for the watermarked block, quantization step $\Delta'$ for the watermarked block with equation (7):

$$\Delta' = 0.01 + RCOUNT' \times \frac{a'}{16}; \quad (7)$$

wherein a' is coefficient of x in an approximate polynomial f'(x,y) that is used for the non-uniform subdivision treatment; and
determining, by the computer system and for the watermarked block, watermark information w' with equation (8):

$$w' = \mod\left(ceil\left(\frac{r'_{1 \cdot col}}{\Delta}\right), 2\right) \quad (8)$$

wherein mod( ) is the modulo operation, and ceil (x) is smallest integer greater than or equal to x, and $r'_{1,col}$ is an element of the matrix R' in the first row and the col' column, and col' is number of largest column for the matrix R'.

9. The method of claim 7, further comprising:
dividing, by the computer system and for each component of R, G, and B components of the watermark image, the binary watermark sequence into a plurality of groups; and
converting, by the computer system, each group into a decimal pixel value.

10. The method of claim 7, further comprising:
conducting, by the computer system and based on private keys and for each component of R, G, and B components of the watermark image, an inverse Arnold transformation on each of the extracted component watermark images.

11. The method of claim 7, further comprising:
selecting, by the computer system, the watermarked blocks of the watermarked image based on a random non-collision sequence.

12. The method of claim 7, wherein both the watermarked image and the watermark image are 24-bit color images.

13. A computer system that embeds a watermark image into a host image to generate a watermarked image, the computer system comprising:
a processor;
a non-transitory computer-readable medium having stored therein instructions that when executed cause the processor to:
divide the watermark image into an Red (R) component, a Green (G) component, and a Blue (B) component;
convert, for each component of the R, G, and B components of the watermark image, each pixel value into a binary sequence to generate a plurality of binary sequences for each component of the R, G, and B components of the watermark image;
combine, for each component of the R, G, and B components of the watermark image, the plurality of binary sequences to form a component binary sequence such that three component binary sequences are formed that correspond to the R, G, and B components of the watermark image;
divide the host image into an R component, a G component, and a B component;
partition each component of the R, G, and B components of the host image into non-overlapping blocks with a non-uniform subdivision treatment;
select, for each component of the R, G, and B components of the host image, embedding blocks of the host image;
perform, for each component of the R, G, and B components of the host image, iteration steps that embeds watermark information into the embedding blocks until the embedding blocks are converted into watermarked blocks such that a watermarked component image is formed that includes the watermarked blocks,
reconstruct three watermarked component images that correspond to the R, G, and B components of the host image such that the watermark image is embedded into the host image to obtain the watermarked image.

14. The computer system of claim 13, wherein the instructions, when executed, further cause the processor to:

decompose an embedding block with QR decomposition to obtain a matrix R and a matrix Q, wherein the matrix R is an upper triangular matrix and the matrix Q is an orthogonal matrix;
embed, for the embedding block, watermark information into the matrix R;
conduct, for the embedding block, an inverse QR operation to obtain a watermarked block; and
move to next embedding block.

15. The computer system of claim 13, wherein the instructions, when executed, further cause the processor to:
store results of the partitioning for each component of the R, G, and B components of the host image into an array RNO, wherein the results include pixel locations X and Y, blocks' width W and height H for the non-overlapping blocks; and
wherein when the instructions cause the processor to perform iteration steps, the instructions further cause the processor to
calculate, based on the array RNO, an area size RCOUNT of the embedding block;
calculate, for the embedding block, quantization step $\Delta$ with equation (1):

$$\Delta = 0.01 + RCOUNT \times a/16 \quad (1),$$

wherein a is a coefficient of x in an approximate polynomial f(x, y) that is used for the non-uniform subdivision treatment;
determine, based on watermark information w, for the embedding block, modifying values T1 and T2 with equations (2) and (3):

$$\text{if } w = 0, \begin{cases} T_1 = -0.5\Delta \\ T_2 = 1.5\Delta \end{cases}, \quad (2)$$

$$\text{if } w = 1, \begin{cases} T_1 = 0.5\Delta \\ T_2 = -1.5\Delta \end{cases}; \quad (3)$$

determine, for the embedding block, quantization results $C_1$ and $C_2$ with equations (4) and (5):

$$C_1 = 2k\Delta + T_1 \quad (4)$$

$$C_2 = 2k\Delta + T_2 \quad (5),$$

wherein $$k = \text{floor}\left(\text{ceil}\left(\frac{r_{1,col}}{\Delta}\right)/2\right),$$

and $r_{1,col}$ is an element of the matrix R in the first row and the col column, col is number of largest column for the matrix R, wherein the matrix R is an upper triangular matrix and is derived from decomposition of the embedding block with QR decomposition, and floor(x) is largest integer less than or equal to x, and ceil (x) is smallest integer greater than or equal to x;
calculate, for the embedding block, an element $r'_{1,col}$ with equation (6):

$$r'_{1,col} = \begin{cases} C_2, \text{ if } \text{abs}(r_{1,col} - C_2) < \text{abs}(r_{1,col} - C_1) \\ C_1, \text{ else} \end{cases}, \quad (6)$$

wherein abs(x) is absolute value of x;
replace, for the embedding block, $r_{1,col}$ with $r'_{1,col}$ in the matrix R to obtain a matrix R'; and
conduct, for the embedding block, an inverse QR operation to obtain a watermarked block.

16. The computer system of claim 13, wherein the instructions, when executed, further cause the processor to:
generate, for each component of the R, G, and B components of the host image, a random non-collision sequence that indicates order of embedding blocks that watermark information is to be embedded.

17. The computer system of claim 13, wherein the instructions, when executed, further cause the processor to:
permute each component of the R, G, and B components for the watermark image using Arnold transformation with private keys.

* * * * *